United States Patent Office 3,256,240
Patented June 14, 1966

3,256,240
COMPOSITIONS COMPRISING A POLYEPOXIDE, A CHLORO-HYDROXY HYDROCARBON PHOSPHATE AND AN EPOXY RESIN CURING AGENT
Percy L. Smith, Dunbar, W. Va., assignor to Union Carbide Corporation, a corporation of New York
No Drawing. Filed Nov. 10, 1960, Ser. No. 68,364
13 Claims. (Cl. 260—47)

This invention relates to flame-resistant epoxide compositions, their method of preparation and particularly to such compositions which are self-extinguishing and possess a high degree of flame resistance.

Resinous materials derived from epoxides are finding extensive utility in the field of insulation, structural reinforcement, electrical encapsulation and in domestic equipment such as refrigerators and freezers. However, one formidable factor limiting the commercial utilization and growth potential of epoxides is their risk of flammability in applications where high temperatures and/or exposure to fire may be encountered. Although various phosphorus and chlorine-containing compounds have been recommended as flameproofing additives for epoxide materials, many of the additives possess undesirable characteristics which detract from their general advantageous properties. For example, the use of a halogen-containing material such as chlorendic anhydride has limited applicability due to its high melting point. Similarly chlorendic anhydride may reduce flammability tendencies but at the same time impart brittleness and thus limit the utility of the resin for its intended purpose.

The present invention is based on the discovery that flameproofing additives obtained by reacting a phosphorus-containing acid with an aliphatic haloepoxide are highly effective for obtaining epoxide compositions which possess a high degree of flame resistance and exhibit a significant retention of desired physical properties. The flameproofing additives of the invention are represented by the following general formula:

(I) 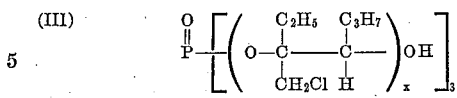

in which R, R¹, R² and R³ are members selected from the group consisting of hydrogen and alkyl, alkenyl, haloalkenyl and haloalkyl radicals of 1 to 8 carbon atoms with the proviso that at least one of said R's is a haloalkyl or haloalkenyl radical; $x$ is a number having a value of 1 to 8; and Y is a member selected from the group consisting of hydrogen and a monovalent radical having the following structure in which $x$, R, R¹, R² and R³ have the meanings hereinbefore designated:

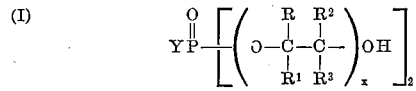

The flameproofing additives conforming to the structural configuration shown above are halogen-substituted phosphites and phosphates which are prepared by a condensation reaction between phosphorus-containing acids and haloepoxides. The condensation reaction can be illustrated by the following equation involving orthophosphoric acid and 2,3-epoxy-2-ethylhexyl chloride:

(II)

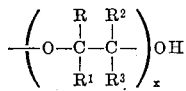

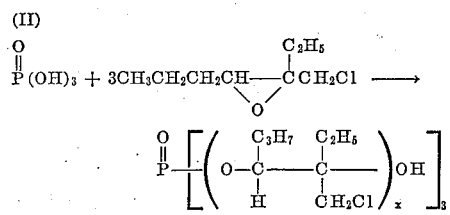

wherein $x$ has the above-described meaning. The oxirane ring also may open so as to yield the product.

(III)
$$\overset{O}{\underset{\|}{P}}{-}\!\!\left[\!\!\left(O{-}\underset{\underset{CH_2Cl}{|}}{\overset{\overset{C_2H_5}{|}}{C}}{-}\underset{\underset{H}{|}}{\overset{\overset{C_3H_7}{|}}{C}}{-}\right)_{\!x}\!\!OH\right]_{\!3}$$

The expression "phosphorus-containing acid," as employed throughout the specification and claims, refers to any Lewis acid which contains phosphorus. The definition of Lewis acids may be found in the publication, "Valence and Structure of Atoms and Molecules," G. N. Lewis, Chemical Catalogue Co., New York, 1923, p. 141. The expression thus includes the ortho, pyro, meta and hypo forms of phosphoric and phosphorous acids. The preferred acids for purposes of preparing the flameproofing additives utilized in accordance with the invention are othophosphoric and orthophosphorous acids.

The starting materials which are condensed with the phosphorus-containing acids to form the flameproofing additives are aliphatic haloepoxides, saturated or unsaturated, which contain 3 to 10 carbon atoms. The halogen constituent of the epoxide is preferably a chlorine atom although the bromine and iodine constituents can be used with good results. Similarly, the epoxide molecule can be substituted with more than one halogen constituent.

Among the aliphatic haloepoxides which can be employed are chloroprene oxide;

3-chloro-1,2-epoxypropane;
3-chloro-1,2-epoxybutane;
1-chloro-2,3-epoxybutane;
1-chloro-3,4-epoxy-1-butene;
3,4-dichloro-1,2-epoxybutane;
1,4-dichloro-2,3-epoxybutane;
Chloroisobutylene oxide;
1-chloro-2,3-epoxypentane;
4-chloro-2,3-epoxypentane;
3-chloro-1,2-epoxypentane;
1,4-dichloro-2,3-epoxypentane;
1-chloro-2,3-epoxyhexane;
1,4-dichloro-2,3-epoxyhexane;
2-chloro-3,4-epoxyhexane;
2,5-dichloro-3,4-epoxyhexane;
4-chloro-2,3-epoxyhexane;
1-chloro-2,3-epoxyheptane;
1,4-dichloro-2,3-epoxyheptane;
4-chloro-2,3-epoxyheptane;
2-chloro-3,4-epoxyheptane;
5-chloro-3,4-epoxyheptane;
2,5-dichloro-3,4-epoxyheptane;
1-chloro-2,3-epoxyoctane;
4-chloro-2,3-epoxyoctane;
1,4-dichloro-2,3-epoxyoctane;
2,3-epoxy-2-ethylhexyl chloride;
3-chloro-4,5-epoxyoctane;
3,6-dichloro-4,5-epoxyoctane;
2,5-dichloro-3,4-epoxyoctane;
5-chloro-3,4-epoxyoctane;
2-chloro-3,4-epoxyoctane;
1-chloro-2,3-epoxynonane;
4-chloro-2,3-epoxynonane;
1,4-dichloro-2,3-epoxynonane;
2-chloro-3,4-epoxynonane;
5-chloro-3,4-epoxynonane;
2,5-dichloro-3,4-epoxynonane;
3-chloro-4,5-epoxynonane;
6-chloro-4,5-epoxynonane;
3,6-dichloro-4,5-epoxynonane;
1-chloro-2,3-epoxydecane;
4-chloro-2,3-epoxydecane;
1,4-dichloro-2,3-epoxydecane;
2-chloro-3,4-epoxydecane;
5-chloro-3,4-epoxydecane;

2,5-dichloro-3,4-epoxydecane;
3-chloro-4,5-epoxydecane;
6-chloro-4,5-epoxydecane;
3,6-dichloro-4,5-epoxydecane;
4-chloro-5,6-epoxydecane; and
4,7-dichloro-5,6-epoxydecane; etc.

The haloepoxides which are employed may be a single compound of definite composition or a mixture of epoxides.

The flameproofing additives are obtained by reacting the haloepoxides above described with a phosphorus-containing acid such as orthophosphoric or orthophosphorous acid. The acids can be used in their anhydrous form or in aqueous solutions, for example, the commercial syrupy solutions of orthophosphoric acid which contain about 85 percent of $H_3PO_4$. The reaction is carried out under atmospheric or superatmospheric pressure at temperatures between about 0° C. and 200° C., preferably between about 25 and 150° C. To the extent required conventional heat transfer means can be used to remove the exothermic heat of reaction. The reactants can be concurrently introduced to a reaction vessel or the acid may be added to the epoxide. The preferred procedure is to add the haloepoxide to the acid with stirring. If desired, the reaction can be carried out in the presence of an inert solvent such as ethyl acetate, butyl acetate, dioxane or other suitable solvent.

The haloepoxide and phosphorus-containing acids are reacted in a proportion of at least 2 moles of epoxide per mole of acid up to proportions ranging as high as 24 moles or more of the epoxide per mole of acid. The period of time required for the reaction will vary with such considerations as pressure and temperature. In general the reaction is complete after about 30 minutes to 5 hours or more of residence time of the reactants in the reactor. Following the reaction the product mixture is subject to a stripping distillation which involves distilling off, under reduced or atmospheric pressure, excess reactants and solvent. The stripping operation is effected in a conventional manner in any suitable apparatus. The desired phosphite or phosphate is then recovered as a residue product which is substantially neutral and colorless.

The reaction between phosphorus-containing acids and haloepoxides can be modified considerably. Thus, for example, it is within the scope of the invention to add varying amounts of an alkylene oxide to the phosphorus-containing acid before and/or after reacting it with a haloepoxide. Such oxides include 1,2-alkylene oxides such as ethylene oxide, propylene oxide, butylene oxide or mixtures thereof. This modification has the advantage of further diversifying the combinations of characteristics obtainable in the ultimate resin product. The amount of alkylene oxide utilized is not critical and is chosen with a view toward the molecular weight and viscosity requirements for a given resin system. The reaction conditions for adding alkylene oxide are generally the same as those described above for the condensation reaction between haloepoxides and phosphorus-containing acids. However, when the acidity of the reaction mixture is essentially nil, it is necessary to add a catalyst (e.g., boron-trifluoride-ethyl ether complex) to effect further addition of the epoxy.

The flameproofing additives are effective for imparting flame resistance to a wide variety of epoxide compositions which can be cured or partially cured to thermoset and thermosetting resins, the cured composition being in the form of a homopolymer or copolymer with various active organic hardeners. The amount of flameproofing additive employed is not critical. As a general guide the flammability characteristics of epoxide resins varies inversely with the phosphorus and halogen content of the flameproofing additives. Thus, for example, it has been found that a phosphorus and chlorine content as low as 0.1% and 0.75% by weight, respectively, can effect appreciable flame resistance. Similarly higher amounts of phosphorus and chlorine on the order of 3.5% and 27%, respectively, are effective but for practical reasons are commercially unattractive. Preferably the amount of flameproofing additive should be sufficient to provide a phosphorus and chlorine content ranging respectively from 0.3 to 3.5% and 2.3 to 15.0% by weight based on the cured resin.

In carrying out the invention the flameproofing additive is mixed with a curable epoxide system which may include, for example, a catalyst, an organic hardener or a combination of organic hardeners more fully described hereinafter. The mixture is usually agitated so as to obtain a homogeneous solution. If the epoxide system and flameproofing additive are immiscible at room temperature or if the epoxide is a solid, it is often desirable to facilitate forming a solution by heating the mixture to a temperature near the highest melting component in the curable composition providing, of course, the application of heat does not effect appreciable curing. Liquid organic solvents which may be employed include diethyl ether, methyl propyl ether, methyl acetate, ethyl propionate, acetone, cyclohexanone, and the like.

Epoxide systems which contain the flameproofing additive can be partially cured or fully cured over a wide temperature range of 10° C. up to 250° C. The usual procedure is to heat the curable composition to a temperature within the range of about 50 to 150° C. to effect a partial cure and thereafter complete the cure at temperatures between about 100 and 200° C. Any one or combination of two or more temperatures within the broad range of 10 to 250° C. can be employed. The time for effecting a partial or complete cure will vary with such considerations as temperature, the particular epoxide employed, the inclusion of a catalyst or organic hardener, and the relative proportions of each in the composition being cured.

Representative epoxide compositions which can be rendered flame-resistant in accordance with the invention are polyepoxides such as, for example, the alkanediol bis(3,4 - epoxycyclohexanecarboxylates), the alkenediol bis(3,4 - epoxycyclohexanecarboxylates), the alkanediol bis(lower alkyl substituted-3,4-epoxycyclohexanecarboxylates), the oxaalkanediol bis(lower alkyl substituted-3,4-epoxycyclohexanecarboxylates), the alkanetriol tris(3,4-epoxycyclohexanecarboxylates), the alkenetriol tris(3,4-epoxycyclohexanecarboxylates), the alkanetriol tris(lower alkyl substituted-3,4-epoxycyclohexanecarboxylates), the oxaalkanetriol tris(3,4 - epoxycyclohexanecarboxylates), the oxaalkanetriol tris(lower alkyl substituted-3,4-epoxycyclohexanecarboxylates), and the like. The above-illustrated polyolpoly(3,4-epoxycyclohexanecarboxylates) can be prepared by epoxidizing the corresponding polyol poly(cyclohexanecarboxylate) with at least a stoichiometric quantity of peracetic acid (preferably contained as solution in ethyl acetate) per carbon to carbon double bond of said polyol poly(cyclohexenecarboxylate), at a temperature in the range of from about 25° to 90° C., for a period of time sufficient to introduce oxirane oxygen at the sites of all the carbon to carbon double bonds contained in the polyol poly(cyclohexenecarboxylate) reagent. The polyol poly(cyclohexenecarboxylates) in turn, can be prepared in accordance with well known condensation techniques, e.g., the esterification of a polyol, e.g., ethylene glycol, diethylene glycol, triethylene glycol, tetraethylene glycol, 1,2-propylene glycol, 1,3-propylene glycol, the polyoxyethylene glycols, 1,4-butanediol, 1,5-pentanediol, 1,6-hexanediol, the octanediols, the octadecanediols, the butenediols, the pentenediols, the hexenediols, the octenediols, 1,2,3-propanetriol, trimethylolmethane, 1,1,1-trimethylolethane, 1,1,1-trimethylolpropane, 1,2,6-hexanetriol, cycloaliphatic triols, aromatic triols, and the like; with a 3-cyclohexenecarboxylic acid, e.g., 3-cyclohexenecarboxylic acid, lower alkyl substituted-3-cyclohexenecarboxylic acid, and the like. The expression "lower alkyl," as used in the disclosure, means an alkyl radical which contains from 1 to 4 carbon atoms.

Other polyepoxides contemplates include, for instance, the bis(3,4-epoxycyclohexylmethyl) hydrocarbon dicarboxylates and the bis(lower alkyl substituted-3,4-epoxycyclohexylmethyl) hydrocarbon dicarboxylates, e.g., Bis(3,4-epoxycyclohexylmethyl) oxalate,
Bis(3,4-epoxycyclohexylmethyl) malonate,
Bis(3,4-epoxycyclohexylmethyl) succinate,
Bis(3,4-epoxycyclohexylmethyl) glutarate,
Bis(3,4-epoxycyclohexylmethyl) adipate,
Bis(3,4-epoxycyclohexylmethyl) maleate,
Bis(3,4-epoxycyclohexylmethyl) tetrahydrophthalate,
Bis(3,4-epoxycyclohexylmethyl) citraconate,
Bis(3,4-epoxycyclohexylmethyl) isocitraconate,
Bis(3,4-epoxy-6-methylcyclohexylmethyl) fumarate,
Bis(3,4-epoxycyclohexylmethyl) pimelate,
Bis(3,4-epoxycyclohexylmethyl) terephthalate,
Bis(3,4-epoxycyclohexylmethyl) azelate,
Bis(3,4-epoxycyclohexylmethyl) sebacate,
Bis(3,4-epoxycyclohexylmethyl) itaconate,
Bis(3,4-epoxycyclohexylmethyl) hexahydrophthalate,
Bis(3,4-epoxycyclohexylmethyl) phthalate,
Bis(3,4-epoxycyclohexylmethyl) glutaconate,
Bis(3,4-epoxycyclohexylmethyl) hydromuconate, and the like.

Other desirable polyepoxides includes the monoesters of 3,4-epoxycyclohexylmethanols and 3,4-epoxycyclohexanecarboxylic acids such as, for example, 3,4-epoxycyclohexylmethyl 3,4-epoxycyclohexane carboxylate,
1-methyl-3,4-epoxycyclohexylmethyl 1-methyl-3,4-epoxycyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxycyclohexanecarboxylate,
4-n-propyl-3,4-epoxycyclohexylmethyl 4-n-propyl-3,4-epoxycyclohexanecarboxylate,
5-isobutyl-3,4-epoxycyclohexylmethyl 5-isobutyl-3,4-epoxycyclohexanecarboxylate,
lower alkyl substituted-3,4-epoxycyclohexylmethyl lower alkyl substituted-3,4-epoxycyclohexanecarboxylate,
halo substituted-3,4-epoxycyclohexylmethyl halo substituted-3,4-epoxycyclohexanecarboxylate,
1-chloro-3,4-epoxycyclohexylmethyl 1-chloro-3,4-epoxycyclohexanecarboxylate,
2-bromo-3,4-epoxycyclohexylmethyl 2-bromo-3,4-epoxycyclohexanecarboxylate, and the like.

Still other desirable polyepoxides include, by way of illustration, the 3-oxatetracyclo[4.4.0.1$^{7,10}$.0$^{2,4}$]undec-8-yl vicinal-epoxyalkyl ethers, the 3-oxatetracyclo[4.4.0.1$^{7,10}$.0$^{2,4}$]undec-8-yl vicinal-epoxycycloalkyl ethers, the 3-oxatetracyclo[4.4.0.1$^{7,10}$.0$^{2,4}$]undec-8-yl vinical-epoxycycloalkylalkyl ethers, the 3-oxatetracyclo[4.4.0.1$^{7,10}$.0$^{2,4}$]undec-8-yl 3-oxatricyclo[3.2.1.0$^{2,4}$]oct-6-yl ethers, the 3-oxatetracyclo[4.4.0.1$^{7,10}$.0$^{2,4}$]undec-8-yl 3-oxatricyclo[3.2.1.0$^{2,4}$]oct-6-ylalkyl ethers, and the like. Specific examples include 3-oxatetracyclo[4.4.0.1$^{7,10}$.0$^{2,4}$]undec-8-yl 2,3-epoxypropyl ether,
3-oxatetracyclo[4.4.0.1$^{7,10}$.0$^{2,4}$]undec-8-yl 3,4-epoxybutyl ether,
3-oxatetracyclo[4.4.0.1$^{7,10}$.0$^{2,4}$]undec-8-yl 2,3-epoxybutyl ether,
3-oxatetracyclo[4.4.0.1$^{7,10}$.0$^{2,4}$]undec-8-yl 3,4-epoxyhexyl ether,
3-oxatetracyclo[4.4.0.1$^{7,10}$.0$^{2,4}$]undec-8-yl 5,6-epoxyhexyl ether,
3-oxatetracyclo[4.4.0.1$^{7,10}$.0$^{2,4}$]undec-8-yl 7,8-epoxyoctyl ether,
3-oxatetracyclo[4.4.0.1$^{7,10}$.0$^{2,4}$]undec-8-yl 2-methyl-2,3-epoxypropyl ether,
3-oxatetracyclo[4.4.0.1$^{7,10}$.0$^{2,4}$]undec-8-yl 2-ethyl-2,3-epoxyhexyl ether,
3-oxatetracyclo[4.4.0.1$^{7,10}$.0$^{2,4}$]undec-8-yl 9,10-epoxystearyl ether,
3-oxatetracyclo[4.4.0.1$^{7,10}$.0$^{2,4}$]undec-8-yl 9,10,12,13-diepoxystearyl ether,
3-oxatetracyclo[4.4.0.1$^{7,10}$.0$^{2,4}$]undec-8-yl 2,3-epoxycyclopentyl ether,
3-oxatetracyclo[4.4.0.1$^{7,10}$.0$^{2,4}$]undec-8-yl 2,3-epoxycyclopentylmethyl ether,
3-oxatetracyclo[4.4.0.1$^{7,10}$.0$^{2,4}$]undec-8-yl alkyl substituted 3,4-epoxycyclohexyl ether,
3-oxatetracyclo[4.4.0.1$^{7,10}$.0$^{2,4}$]undec-8-yl 3,4-epoxycyclohexyl ether,
3-oxatetracyclo[4.4.0.1$^{7,10}$.0$^{2,4}$]undec-8-yl 2,3-epoxycyclohexyl ether,
3-oxatetracyclo[4.4.0.1$^{7,10}$.0$^{2,4}$]undec-8-yl 3,4-epoxycyclohexylmethyl ether,
3-oxatetracyclo[4.4.0.1$^{7,10}$.0$^{2,4}$]undec-8-yl 6-methyl-3,4-epoxycyclohexylmethyl ether,
3-oxatetracyclo[4.4.0.1$^{7,10}$.0$^{2,4}$]undec-8-yl 5-methyl-3,4-epoxycyclohexylmethyl ether,
3-oxatetracyclo[4.4.0.1$^{7,10}$.0$^{2,4}$]undec-8-yl alkyl substituted 3-oxatricyclo[3.2.1.0$^{2,4}$]oct-6-yl ether,
3-oxatetracyclo[4.4.0.1$^{7,10}$.0$^{2,4}$]undec-8-yl 3-oxatricyclo[3.2.1.0$^{2,4}$]oct-6-yl ether, and the like.

Other polyepoxides contemplated include, for example, the bis(vicinal-epoxycycloalkyl) sulfones, the bis(vicinal-epoxycycloalkylalkyl) sulfones, the vicinal-epoxyalkyl 3-oxatetracyclo[4.4.0.1$^{7,10}$.0$^{2,4}$]undec-8-yl sulfones, and the like. In the above-illustrated diepoxy sulfones, it should be noted that the vicinal-epoxy group is one carbon atom removed from the sulfone group. Examples of these diepoxy sulfones include Bis(2,3-epoxycyclopentyl) sulfone,
Bis(lower alkyl substituted 2,3-epoxycyclopentyl) sulfone,
Bis(2-ethyl-2,3-epoxycyclopentyl) sulfone,
Bis(4-n-butyl-2,3-epoxycyclopentyl) sulfone,
Bis(3,4-epoxycyclohexyl) sulfone,
Bis(lower alkyl substituted 3,4-epoxycyclohexyl) sulfone,
Bis(2-methyl-3,4-epoxycyclohexyl) sulfone,
Bis(5-isopropyl-3,4-epoxycyclohexyl) sulfone,
Bis(3,4-epoxycycloheptyl) sulfone,
Bis(lower alkyl substituted 3,4-epoxycycloheptyl) sulfone,
Bis(2,3-epoxycyclopentylalkyl) sulfone,
Bis(2,3-epoxycyclopentylmethyl) sulfone,
Bis(2,3-epoxycyclopentylpropyl) sulfone,
Bis(3,4-epoxycyclohexylalkyl) sulfone,
Bis(3,4-epoxycyclohexylmethyl) sulfone,
Bis(3,4-epoxycyclohexylbutyl) sulfone,
Bis(3,4-epoxycycloheptylalkyl) sulfone,
Bis(3,4-epoxycycloheptylmethyl) sulfone,
Bis(3-oxatricyclo[3.2.1.0$^{2,4}$]oct-6-yl) sulfone,
Bis(3-oxatetracyclo[4.4.0.1$^{7,10}$.0$^{2,4}$]undec-8-yl) sulfone,
2,3-epoxypropyl 2,3-epoxycyclopentyl sulfone,
2-methyl-2,3-epoxypropyl 2,3-epoxy cyclopentylmethyl sulfone,
10,11-epoxyoctadecyl 3,4-epoxycyclohexyl sulfone,
2-methyl-2,3-epoxyhexyl 3-oxatricyclo[3.2.1.0$^{2,4}$]oct-6-yl sulfone,
2,3-epoxycyclopentyl 3-oxatetracyclo[4.4.0.1$^{7,10}$.0$^{2,4}$]undec-8-yl sulfone,
2-methyl-3,4-epoxycyclohexyl 2,3-epoxycyclopentylethyl sulfone,
3,4-epoxypentyl 2-n-butyl-3,4-epoxycyclohexyl sulfone, and the like.

Still other polyepoxides contemplated include, for example,

Bis(vicinal-epoxycyclohexoxyalkyl) sulfone,
Bis(lower alkyl substituted-vicinal-epoxycyclohexoxyalkyl) sulfone, Bis(vicinal-epoxycyclohexylalkoxyalkyl) sulfone,
Bis(lower alkyl substituted-3-oxatricyclo[3.2.1.0$^{2,4}$]-6-octoxyalkyl) sulfone,
Bis(3-oxatetracyclo[4.4.0.1$^{7,10}$.0$^{2,4}$]-8-undecoxyalkyl) sulfone,
Vicinal-epoxyalkoxyalkyl 3-oxatricyclo[3.2.1.0$^{2,4}$]-6-octoxyalkyl sulfone,
Vicinal-epoxycyclohexoxyalkyl 3-oxatetracyclo[4.4.0.1$^{7,10}$.0$^{2,4}$]-8-undecoxyalkyl sulfone, and the like. Specific examples of the preceding diepoxy diether sulfones include, among others, Bis(3,4-epoxycyclohexoxypropyl) sulfone,
Bis(2-methyl-3,4-epoxycyclohexoxyethyl) sulfone,
Bis(2,5-dimethyl-3,4-epoxycyclohexoxypropyl) sulfone,
Bis(2,3-epoxycyclohexylmethoxyethyl) sulfone,
Bis(3,4-epoxycyclohexylethoxypropyl) sulfone,
Bis(lower alkyl substituted-3,4-epoxycyclohexylmethoxypropyl) sulfone,
Bis(3-oxatricyclo-[3.2.1.0$^{2,4}$]-6-octoxyethyl) sulfone,
Bis(3-oxatetracyclo-[4.4.0.1$^{7,10}$.0$^{2,4}$]-8-undecoxypropyl) sulfone,
2,3 - epoxypropoxyethyl 3 - oxatricyclo[3.2.1.0$^{2,4}$] - 6-octoxypropyl sulfone,
2-ethyl-2,3-epoxyhexoxypropyl 3,4-epoxycyclohexoxyethyl sulfone,
9,10-epoxyoctadecoxypropyl 2-methyl - 3,4 - epoxycyclohexoxyethyl sulfone,
Bis(ethyl substituted-3-oxatetracyclo-[4.4.0.1$^{7,10}$.0$^{2,4}$]-8-undecoxyethyl) sulfone,
Bis(dimethyl substituted-3-oxatetracyclo[4.4.0.1$^{7,10}$.0$^{2,4}$]-8-undecoxyethyl) sulfone,
Bis(lower alkyl substituted-3-oxatetracyclo-[4.4.0.1$^{7,10}$.0$^{2,4}$]-8-undecoxyethyl) sulfone,
and the like.

Additional polyepoxides contemplated include, for example, omega, omega'-sulfonyldialkyl Bis(vicinal-epoxycycloalkanecarboxylate), omega, omega'-sulfonyldialkyl Bis(vincinal-epoxycycloalkylalkanoate, omega, omega'-sulfonyldialkyl Bis(3-oxatricyclo[3.2.1.0$^{2,4}$]octane-6-carboxylate), and the like. Illustrative examples of the above-mentioned diepoxy diester sulfones are
2,2' - sulfonyldiethyl Bis(2,3 - epoxycyclopentane - carboxylate),
4,4' - sulfonyldibutyl Bis (3,4 - epoxycyclohexane - carboxylate),
3,3' - sulfonyldipropyl Bis (3,4 - epoxycycloheptane-carboxylate,
2,2' - sulfonyldiethyl Bis (2,3 - epoxycyclopentyl-acetate),
4,4'-sulfonyldibutyl Bis(2,3-epoxycyclopentylpropionate),
2,2'-sulfonyldiethyl Bis(3-oxatricyclo[3.2.1.0$^{2,4}$] octane-6-carboxylate),
and the like.

Still other polyepoxides contemplated include, for example, the 3 - oxatetracyclo[4.4.0.1$^{7,10}$.0$^{2,4}$]undec - 8 - yl vincinal - epoxyalkanoates, the 3 - oxatetracyclo[4.4.0.1$^{7,10}$.0$^{2,4}$]-undec - 8 - yl vicinal - epoxycycloalkanecarboxylates, the 3 - oxatetracyclo[4.4.0.1$^{7,10}$.0$^{2,4}$] undec-8-yl vincinal - epoxycycloalkylalkanoates, the 3 - oxatetracyclo[4.4.0.1$^{7,10}$.0$^{2,4}$]undec-8-yl 3 - oxatricyclo[3.2.1.0$^{2,4}$] octyl-6-alkanoates, and the like. Specific examples include
3-oxatetracyclo[4.4.0.1$^{7,10}$.0$^{2,4}$] - undec - 8 - yl 2,3-epoxypropionate,
3 - oxatetracyclo-[4.4.0.1$^{7,10}$.0$^{2,4}$]undec - 8 - yl 2,3-epoxybutyrate,
3-oxatetracyclo[4.4.0.1$^{7,10}$.0$^{2,4}$]undec - 8 - yl 9,10-epoxystearate,
3-oxatetracyclo[4.4.0.1$^{7,10}$.0$^{2,4}$]undec - 8 - yl 9,10,12,13-diepoxystearate,
3-oxatetracyclo[4.4.0.1$^{7,10}$.10$^{2,4}$]undec - 8 - yl 2,3-epoxycyclopentanecarboxylate,
3-oxatetracyclo[4.4.0.1$^{7,10}$.0$^{2,4}$]undec - 8 - yl 3,4-epoxycyclopentanecarboxylate,
3-oxatetracyclo[4.4.0.1$^{7,10}$.0$^{2,4}$]undec - 8 - yl 4-methyl-2-3-epoxycyclopentanecarboxylate,
3-oxatetracyclo[4.4.0.1$^{7,10}$.0$^{2,4}$]undec-8-yl 2,3-epoxycyclohexanecarboxylate,
3-oxatetracyclo[4.4.0.1$^{7,10}$.0$^{2,4}$]undec - 8 - yl 2-methyl-3,4-epoxycyclohexanecarboxylate,
3-oxatetracyclo[4.4.0.1$^{7,10}$.0$^{2,4}$]undec - 8 - yl 3-oxatricyclo[3.2.1.0$^{2,4}$]octane-6-carboxylate,
3-oxatetracyclo[4.4.0.1$^{7,10}$.0$^{2,4}$]undec - 8 - yl 3-oxatricyclo[3.2.1.0$^{2,4}$]octyl - 6 - acetate,
and the like.

Further useful polyepoxides which are contemplated include, for example, 4-vinylcyclohexene dioxide, dicyclopentadiene dioxide, Bis(2,3-epoxycyclopentyl) ether, Bis(3-oxatetracyclo[4.4.0.1$^{7,10}$.0$^{2,4}$]undec - 8 - yl ether, and the like. The diether diepoxides disclosed in U.S. 2,543,419 also are useful polyepoxides which are contemplated in the invention.

Further included are polyglycidyl polyethers of polyhydric phenols, epoxidized soybean oil, epoxidized liquid polybutadiene, the vic-epoxyhydrocarbyl substituted aromatic hydrocarbons, and the like. Polyepoxides of these types and their preparation are disclosed in the art, for example, in U.S. Patents 2,682,515, 2,633,458 and 2,938,875, hereby incorporated by reference to the extent pertinent.

The diepoxy diester sulfones can be prepared by the reaction of, for example, omega, omega'-thioalkanol bis-(cycloalkenecarboxylate), omega, omega' - thioalkanol bis(bicycloalkenylcarboxylate), and the like, with at least four mols of peracetic acid per mol of sulfide reagent under operative conditions to be explained hereinafter. In this reaction, the sulfide moiety, i.e., —S—, is oxidized to the sulfonyl group, i.e., —SO$_2$—, and oxirane oxygen is introduced at the site of both carbon to carbon double bonds of the sulfide reagent. The omega, omega'-thiodialkanol di(unsaturated esters), in turn, can be prepared by the diesterification of stoichiometric quantities of a thiodialkanol, e.g., thiodiglycol, 3,3'-thiodipropanol, 8,8'-thiodioctanol, and the like, with an unsaturated organic acid, e.g., 3-cyclohexenecarboxylic acid, bicyclo[2.2.1]-5-heptene-2-carboxylic acid, and the like, in toluene or other appropriate inert organic media, using a sulfuric acid catalyst, and heating under reflux until the water formed by the reaction is completely removed as the lower layer of the distillate. The catalyst is then neutralized with an excess of sodium acetate, and after filtration, the esterification product is distilled, recovering the corresponding omega, omega'-thiodialkanol di(unsaturated ester).

The diepoxy diether sulfones can be prepared as follows. One route involves the reaction of, for example, divinyl sulfone with a cyclohexenol, polycyclohexenol, etc., at elevated temperatures, e.g., about 50° to 100° C., in the presence of a basic catalyst, to produce the corresponding mono- or diether sulfone depending upon the concentration of the reactants. For example, greater than two mols of ethylenically unsaturated alcohol (ROH) per mol of divinyl sulfone will give the diether sulfone as illustrated in the following equation below.

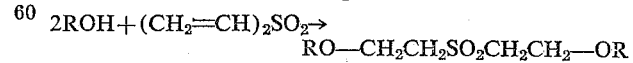
2ROH+(CH$_2$=CH)$_2$SO$_2$→
RO—CH$_2$CH$_2$SO$_2$CH$_2$CH$_2$—OR

The use of less than one mol of ethylenically unsaturated alcohol (ROH) per mol of divinyl sulfone results in the monoether sulfone as shown below.

ROH+(CH$_2$=CH)$_2$SO→RO—CH$_2$CH$_2$SO$_2$CH=CH$_2$

The resulting monoether sulfone product then can be reacted with a molar excess of a different ethylenically unsaturated alcohol (R'OH) to produce an unsymmetrical diether sulfone as follows:

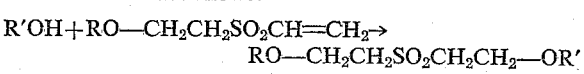
R'OH+RO—CH$_2$CH$_2$SO$_2$CH=CH$_2$→
RO—CH$_2$CH$_2$SO$_2$CH$_2$CH$_2$—OR'

The resulting bis(ethylenically unsaturated ether) sulfone then can be reacted with a solution of peracid in the manner explained hereinafter.

The symmetrical and unsymmetrical diepoxy diether sulfones can be prepared by the reaction of alkali metal sulfide with a chlorohydrin, at elevated temperatures, to produce bis(omega-hydroxyalkyl) sulfide which then can be converted to the sodium salt, followed by reacting said salt with an ethylenically unsaturated halide, at elevated temperatures, to give the bis(ethylenically unsaturated ether) sulfide. The following equation illustrates the preparation.

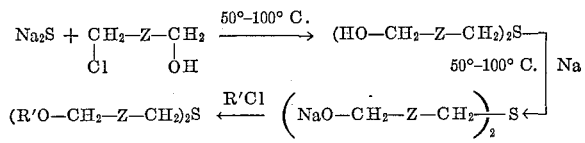

wherein Z represents a single bond bridging the two methylene groups, or it represents a divalent saturated aliphatic hydrocarbon radical; and wherein R' represents cycloalkenyl, polycycloalkenyl, and the like, in which the ethylenic bond, $>C=C<$, is at least one carbon atom removed from the chloro radical. The bis(ethylenically unsaturated ether) sulfide then can be reacted with at least 4 mols of peracid per mol of sulfide under the operative conditions noted in the epoxidation process discussed hereinafter. In this reaction, the sulfide moiety, i.e., —S—, is oxidized to the sulfonyl group, i.e., —SO$_2$—, and oxirane oxygen is introduced at the site of both carbon to carbon double bonds of the sulfide reagent.

Various other diepoxy sulfones can be prepared in the following manner. For instance, a conjugated hydrocarbon diene, e.g., 1,3-butadiene, 1,3-hexadiene, cyclopentadiene, alkyl substituted-cyclopentadiene, etc., can be reacted with less than about 0.5 mol of divinyl sulfone per mol of diene, at elevated temperatures, to provide a bis(cycloalkenyl) sulfone product. Diepoxidation of this product in the manner explained hereinafter produces the corresponding diepoxy sulfone. A further route for preparing various symmetrical and unsymmetrical diepoxy sulfones involves the reaction of haloalkene or halocycloalkene, e.g., 3-chloropropene, 3-chlorocyclopentene, 3-chloro-tricyclo[4.3.0.1$^{2,5}$]dec-7-ene, 5-chloro-bicyclo[2.2.1]hept-2-ene, 4-chlorocyclohexene, etc., with the sodium salt of alkenyl mercaptan or cycloalkenyl mercaptan, i.e., RSNa wherein R can be alkenyl or cycloalkenyl and in which the RSNa preferably is contained in the corresponding mercaptan as a vehicle, at elevated temperatures, to produce the diunsaturated sulfide. The resulting diunsaturated sulfide product then can be reacted with at least 4 mols of peracetic acid per mol of said sulfide, in the manner illustrated hereinafter, to produce the corresponding diepoxy sulfone.

The following route is applicable to the preparation of various polyepoxides illustrated previously. For example, Tricyclo[4.3.0.1$^{2,5}$]-7-decen-3-yl alkenyl ether,
Tricyclo[4.3.0.1$^{2,5}$]-7-decen-3-yl cycloalkenyl ether,
Tricyclo[4.3.0.1$^{2,5}$]-7-decen-3-yl bicyclo[2.2.1]-5-hepten-2-yl ether,
Tricyclo[4.3.0.1$^{2,5}$]-7-decen-3-yl alkenoate,
Tricyclo[4.3.0.1$^{2,5}$]-7-decen-3-yl cycloalkenecarboxylate,
Tricyclo[4.3.0.1$^{2,5}$]-7-decen-3-yl bicyclo[2.2.1]-5-heptene-2-carboxylate, and the like; can be epoxidized with a solution of peracid, e.g., perbenzoic acid, perpropionic acid, peracetic acid, and the like, in an inert normally-liquid organic medium such as ethyl acetate; at a temperature in the range of from about 25° C. to about 90° C.; and for a period of time sufficient to introduce oxirane oxygen at the site of all of the carbon to carbon double bonds of the olefinically unsaturated reagent. Periodical analysis of samples of the reaction mixture to determine the quantity of peracetic acid consumed during the diepoxidation reaction can be readily performed by the operator by well-known procedures. Theoretically, to effect substantially complete epoxidation of the olefinically unsaturated reagent, at least a stoichiometric quantity of peracid per carbon to carbon double bond of said reagent should be employed. The ethyl acetate and acid by-product can be recovered from the reaction product mixture, for example, by distillation under reduced pressure. If desired, the residue product can be subjected to fractional distillation, crystallization, and the like, to obtain the diepoxy sulfone product in high purity.

The olefinically unsaturated reagents, in turn, can be prepared by the following exemplary routes. For instance, the diolefinically unsaturated ethers, e.g., tricyclo[4.3.0.1$^{2,5}$]-7-decen-3-yl alkenyl ether, tricyclo[4.3.0.1$^{2,6}$]-7-decen-3-yl cycloalkenyl ether, and the like, can be prepared by the reaction of the unsaturated alcohols such as alkenol, cycloalkenol, cycloalkenylalkanol, bicycloalkenol, bicycloalkenylalkanol, and the like, with dicyclopentadiene, in the presence of a Lewis acid catalyst such as boron trifluoride, and the like, at a temperature in the range of from about 50° to 200° C. The reaction product mixture is subsequently neutralized by a suitable neutralizing agent such as sodium carbonate, powdered lime, and the like, filtered, and finally distilled under reduced pressure to recover the diolefinically unsaturated ether product.

The diolefinic monoester reagents, e.g., tricyclo[4.3.0.1$^{2,5}$]-7-decen-3-yl cycloalkenecarboxylate, tricyclo[4.3.0.1$^{2,5}$]-7-decen-3-yl bicyclo[2.2.1]-5-heptene-2-carboxylate, and the like, can be prepared by the addition of an ethylenically unsaturated monocarboxylic acid, e.g., alkenoic acid, cycloalkenecarboxylic acid, cycloalkenylalbanoic acid, bicycloalkenecarboxylic acid, bicycloalkenylalkanoic acid, and the like, to dicyclopentadiene, and heating the resulting mixture, under stirring, at temperatures of from about 60° C. to 120° C. for three to five hours. The reaction is conducted in the presence of a small quantity of an inorganic acidic catalyst such as sulfuric acid, boron trifluoride, and the like. The resulting reaction product mixture then can be washed with water and soda solution, dried, and distilled under reduced pressure to thus recover the diolefinic monoester product.

The aforementioned polyepoxides may also be employed in combination with monoepoxides to modify and vary the characteristics obtainable in the cured resin. Such modifiers include, among others, monoepoxides such as styrene oxide, ethyl styrene oxide, divinylbenzene monoxide, allyl glycidyl ether, vinylcyclohexene monoxide, butadiene monoxide, isobutylene oxide, and the like.

If desired, acidic or basic catalysts can be incorporated into the curable epoxide compositions to promote a faster cure. Catalyst concentrations can be varied over an extensive range from about 0.001 to 5% by weight based on the polyepoxide.

Basic and acidic catalysts which can be employed include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the amines, e.g., alpha-methylbenzyldimethylamine, dimethylethylamine, triethylamine, tripropylamine, trimethylammonium hydroxide, and the like.

As previously mentioned, the polyepoxides illustrated above can be homopolymerized or copolymerized with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing the active organic hardener(s) to become polymerized. The active organic hardeners can also be employed in varying amounts so as to give a wide variety of properties to the cured epoxide system. Typical groups which are reactive with epoxy groups are active hydrogen groups such as hydroxyl groups, carboxyl groups, thiol groups, isocyanate groups, isothiocyanate groups, halide atoms of acyl halides, and the like. Oxydicarbonyl groups such as those contained by polycarboxylic acid anhydrides are also active with epoxy groups. One oxydicarbonyl group will react with two epoxy groups and, in this connection, polycarboxylic acid anhydrides need only contain one oxydicarbonyl group in order to function as an active organic hardener with the epoxide compositions of this invention. Stated differently, one oxydicarbonyl group of an anhydride is equivalent to two epoxy-reactive groups.

Representative active organic hardeners include polycarboxylic acids, polycarboxylic acid anhydrides, polyols, i.e., polyhydric phenols and polyhydric alcohols, polythiols, polyisocyanates, polythioisocyanates, polyacyl halides and others.

The term "polycarboxylic acid," as used above, refers to a compound or polymer having two or more carboxyl groups to the molecule. Curable mixtures can be formed from the epoxide compositions and polycarboxylic acids, which mixtures can be cured to produce a wide variety of useful products. Valuable resins can be made from mixtures containing such amounts of an epoxide composition and polycarboxylic acid as to provide 0.3 to 2.0 carboxyl groups of the acid for each epoxy group contained by the amount of the epoxide composition.

Representative polycarboxylic acid hardeners include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycollic acid, dilactic acid, thiodiglycollic acid, 4-amyl-2,3-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl,1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof which have a molecular weight within the range of 500 to 5000, and the like.

Also, as polycarboxylic acids useful in the polymerizable compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mol ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol and the like; trihydric alcohols such as glycerol, trimethylolethane, hexane-1,2,6-triol, 1,1,1-trimethylolpropane, and the ethylene oxide and propylene oxide adducts thereof; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl diethers of 2,2-propane bisphenol, and reactive hydrogen-containing organic compounds, e.g., amines, polycarboxylic acids, polyhydric compounds and the like. In forming the polycarboxy polyesters, it is preferable to use a dihydric, trihydric or tetrahydric aliphatic or oxaaliphatic alcohol. The mol ratios in which the polycarboxylic acid or anhydride can be reacted with polyhydric alcohols in preparing polycarboxylic polyesters useful in the compositions are those which provide polyesters having more than two carboxy groups per molecule as above noted.

A preferred aspect of the invention is the use of a polycarboxylic acid anhydride as an essential component in the curable formulations to provide resins having diversified and valuable properties. Particularly valuable self-extinguishing resins can be made from mixtures containing such amounts of polycarboxylic acid anhydride and epoxide compositions as to provide 0.2 to 3.0 carboxy equivalent of the anhydride for each epoxy group of the epoxide composition. It is preferred, however, to make resins from curable mixtures which contain such amounts of polycarboxylic acid anhydride and epoxide composition as to provide 0.4 to 2.0 carboxy equivalent of anhydride for each epoxy group contained by the amount of epoxide concentration.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorophthalic anhydride, tetrahydrophthalic anhydride, methyltetrahydrophthalic anhydride, tetrachlorophthalic anhydride; hexachloroendomethylene-tetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and alicyclic compounds having conjugated double bonds, e.g., methylbicyclo-[2.2.1]heptene-2,3-dicarboxylic anhydride.

Thermoset resins can be prepared from mixtures containing the epoxide compositions and polyols by providing 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups.

Representative polyols include ethylene glycol, diethylene glycol, polyethylene glycols, propylene glycol, dipropylene glycol, polypropylene glycols, trimethylene glycols, butanediols, pentanediols, 12,13-tetracosanediol, glycerol, polyglycerols, pentaerythritol, sorbitol, polyvinyl alcohols, cyclohexanediols, inositol, dihydroxytoluenes, resorcinol, catechol, bis(4-hydroxyphenyl)-2,2-propane, bis(4-hydroxyphenyl) methane, and the ethylene and propylene oxide adducts thereof, etc.

The flameproofing additives utilized in accordance with the invention have been found to offer distinct advantages in the preparation of self-extinguishing epoxide resins. For example, in polyepoxide-dicarboxylic acid anhydride systems which require a polyol cross-linking initiator, the halogen-substituted phosphites and phosphates can be substituted for part or all of the polyol. However, if no initiator is required, the flameproofing additives can be used as such to obtain resins possessing a high degree of flame resistance. The flameproofing additives are versatile in that they can be reacted initially with acids and/or anhydrides to provide mixed ester-acids which can be further polymerized with polyepoxides. Curable polyepoxide compositions containing the flameproofing additives find extensive utility inasmuch as they can be spread, brushed, or sprayed by techniques known in the paint, varnish and lacquer industries.

The term "flame-resistant," employed throughout the specification and claims, is used to characterize a material which does not burn readily. The term "self-extinguishing" is defined in accordance with the "Tentative Method of Test for Flammability of Plastic Foams and Sheeting," ASTM D–635–56T. In this test the flame of a Bunsen burner, having a blue cone of about 1½ inches in height, is applied to the front edge of the specimen, 5.0" x 0.5" x 0.5", and allowed to remain in contact therewith for a period of 30 seconds. A sample is judged self-extinguishing if no evidence of ignition such as flame or progressive glow is seen in the specimen after removal of the flame.

The following examples illustrate the best mode now contemplated for carrying out the invention.

*Example 1*

Into 98 grams (1.0 mol) of agitated anhydrous phosphoric acid was slowly added, dropwise, 694 g. (7.5 mols) of 3-chloro-1,2-epoxypropane over a period of 1.13 hour. After the addition, the reaction was heated an additional 0.5 hour at 100° C. The reaction product was then stripped at 100° C. under a pressure of <2 mm. The residue weighed 515 g., and an acidity determination indicated that the residue product was essentially neutral and analyzed percent Cl=30.3 (theory=31.05); percent C=31.75 (theory=31.52); percent H=5.25 (theory=5.00); percent P=5.99 (theory=6.01). The structure was approximately:

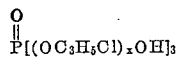

where $x=1.50$.

*Example 2*

To 116 grams of 84.2% syrupy phosphoric acid (1.0 mol of contained $H_3PO_4$) was added 1110 g. (12.0 mols) of 3-chloro-1,2-epoxypropane over a period of 65 minutes. Cooling was necessary in order to maintain the temperature of the agitated reaction mixture at 25° C. and also for 2 hours after the addition was completed. The reaction mixture was then stripped and a colorless residue product obtained which had the following properties: percent Cl=31.94 (theory=32.68); percent C=33.27 (theory=33.20); percent H=5.29 (theory=5.29); percent P=4.04 (theory=3.92); hydroxyl equivalent=153.2 (theory=156.2). Since the water in the starting acid was consumed, the product is a mixture containing structures such as that shown in Example 1 as well as glycols formed by the reaction of the epoxide and water.

*Example 3*

A mixture consisting of 51.3 g. of dicyclopentadiene dioxide, 24.3 g. of maleic anhydride, and 29.4 g. of a 3-chloro-1,2-epoxypropane adduct of anhydrous phosphoric acid as prepared in Example 1 having a molecular weight of 711.2 (equivalents ratio=1.0 epoxy:0.8 carboxyl:0.2 hydroxyl) was agitated and heated to a temperature of 90° C. The resultant solution was poured into three resin molds (6" x ½" x ½") and heated at 80° C. for 21.25 hours. Gelation did not occur at 80° C. and the solutions were heated to 120° C. where they gelled after two hours. After curing a total of 4 hours at 120° C., 1 hour at 160° C., and 6 hours at 200° C., the hard yellow resin bars (percent P=1.22 and percent Cl=9.27) were removed from the molds and found to have a Barcol hardness of 46 and a heat distortion temperature of 220° C. On a flame retardant test the resin was found to be self-extinguishing in two seconds or less.

*Example 4*

A mixture consisting of 154 g. of dicyclopentadiene dioxide, 74.2 g. of maleic anhydride, and 16.8 g. of trimethylolpropane (equivalents ratio=1.0 epoxy:0.8 carboxyl:0.2 hydroxyl) was agitated and heated to a temperature of 90° C. The resultant solution was poured into resin molds (6" x ½" x ½") and cured as follows: 1 hour at 120° C., 1 hour at 160° C., and 6 hours at 200° C. The hard yellow resin bars were found to have a Barcol hardness of 51 and a heat distortion temperature of 243° C. On the flame retardant test the resin was found to ignite very readily and to sustain burning after the flame source was removed. After allowing to burn vigorously for 30 seconds, the flame had to be blown out.

*Example 5*

A mixture consisting of 40.0 g. of dicyclopentadiene dioxide, 19.0 g. of maleic anhydride, and 46.0 g. of a 3-chloro-1,2-epoxypropane adduct of anhydrous phosphoric acid as prepared in Example 1 having a molecular weight of 711.2 (equivalents ratio=1.0 epoxy:0.8 carboxyl:0.4 hydroxyl) was agitated and heated to a temperature of 90° C. The resulant solution was used in preparing resin bars (percent P=1.91 and percent Cl=14.5) in exactly the same manner as Example 1. Employing the above flammability test the resin bars, which had a Barcol hardness of 41 and a heat distortion temperature of 95° C., were found to be self-extinguishing within 0.5 second.

*Example 6*

A mixture consisting of 17.8 g. of the diglycidyl ether of Bisphenol A having an epoxy equivalent of 191, 8.4 g. of methyl "Nadic" anhydride,* 8.8 g. of a 3-chloro-1,2-epoxypropane adduct of anhydrous phosphoric acid as prepared in Example 1 having a molecular weight of 706, and 0.20 g. of benzyldimethylamine as catalyst (equivalents ratio=1.0 epoxy:1.0 carboxyl:0.4 hydroxyl) was agitated and heated to a temperature of 90° C. The resultant solution was used to make resin bars (percent P=1.1 and percent Cl=8.3) which were cured 2 hours ---
*Methylbicyclo[2.2.1]heptene-2,3-dicarboxylic anhydride.

at 120° C. and 6 hours at 160° C. The resin which was found to be very resistant to burning, had a Barcol hardness of 16 and a heat distortion temperature of 69° C. Upon further curing for 24 hours at 200° C. a weight loss of 1.7 percent was found and the resultant resin was self-extinguishing within 4 seconds. It had a heat distortion temperature of 62° C.

*Example 7*

A mixture consisting of 15.8 g. of bis(3,4-epoxy-6-methylcyclohexylmethyl) adipate having an epoxy equivalent of 222, 10.9 g. of hexahydrophthalic anhydride, and 8.3 g. of a 3-chloro-1,2-epoxypropane adduct of anhydrous phosphoric acid as prepared in Example 1 having a molecular weight of 706 (equivalents ratio=1.0 epoxy: 1.0 carboxyl:0.5 hydroxyl) was agitated and heated to a temperature of 110° C. The resultant solution was used to make resin bars which were cured 2 hours at 120° C. and 6 hours at 160° C. The resin (percent P=1.04 and percent Cl=7.85) had a Barcol hardness of 8 and a heat distortion temperature of 39° C. It was flame resistant in that it burned only with difficulty.

*Example 8*

A mixture consisting of 13.6 g. of 3,4-epoxy-6-methylcyclohexylmethyl 3,4 - epoxy-6 - methylcyclohexanecarboxylate, 13.1 g. of phthalic anhydride, and 8.3 g. of a 3-chloro-1,2-epoxypropane adduct of anhydrous phosphoric acid as prepared in Example 1 having a molecular weight of 706 (equivalents ratio=1.0 epoxy:1.0 carboxyl: 0.4 hydroxyl) was agitated and heated to a temperature of 115° C. The resultant solution was used to make resin bars which were cured 2 hours at 120° C. and 6 hours at 160° C. The resin (percent P=1.04 and percent Cl=7.85) had a Barcol hardness of 30 and a heat distortion temperature of 76° C. It was flame resistant in that it burned with difficulty.

*Example 9*

A flame-resistant resin was prepared from a solution of 8.5 g. of 3,4-epoxy-6-methylcyclohexylmethyl 3,4-epoxy-6-methylcyclohexanecarboxylate, 6.5 g. of a 3-chloro-1,2-epoxypropane adduct of anhydrous phosphoric acid as prepared in Example 1 having a molecular weight of 706 (equivalents ratio=1.0 epoxy:0.5 hydroxyl) and 0.75 g. of boron trifluoride-monoethylamine complex as catalyst. The solution was cured at 120° C. for 2 hours and at 160° C. for 6 hours. It was flame resistant in that it burned with difficulty.

*Example 10*

Substitution of an equivalent amount of hydroxyl as trimethylolpropane for the epoxypropane adduct of phosphoric acid in Example 9 resulted in a resin which readily supported combustion. In this formulation 13.1 g. of the carboxylate and 1.9 g. of trimethylolpropane were used.

*Example 11*

A mixture consisting of 55.4 g. of dicyclopentadiene dioxide, 26.5 g. of maleic anhydride, and 23.1 g. of a 3-chloro-1,2-epoxypropane adduct of anhydrous phosphoric acid as prepared in Example 1 having a molecular weight of 515 (equivalents ratio=1.0 epoxy:0.8 carboxyl:0.2 hydroxyl) was heated with agitation to 90° C. The resultant solution was used to make resin bars which were cured 4 hours at 120° C., 2 hours at 160° C., and 6 hours at 200° C. The resin, which had a Barcol hardness=45, a heat distortion temperature of 208° C., and contained 1.32 percent phosphorus and 6.83 percent chlorine, was found to be self-extinguishing within 1.5 to 9 seconds.

*Example 12*

A mixture consisting of 56.5 g. of dicyclopentadiene dioxide, 27.0 g. of maleic anhydride, and 21.5 g. of a 3-chloro-1,2-epoxypropane adduct of syrupy phosphoric acid as prepared in Example 2 having an hydroxyl equivalent of 156.2 (equivalents ratio=1.0 epoxy:0.8 carboxyl: 0.2 hydroxyl) was agitated and heated to a temperature of 90° C. to effect solution. Resin bars were prepared from this solution by curing for 2 hours at 120° C. and 6 hours at 160° C. The resultant resin (percent P=0.8 and percent Cl=6.7) had a Barcol hardness of 50, and a heat distortion temperature of 160° C. It was self-extinguishing within 2.5 minutes. After further curing at 200° C. for 6.0 hours the resin had a Barcol hardness of 55 and a heat distortion temperature of 227° C. It was self-extinguishing within 1.5 seconds.

*Example 13*

A flame-resistant resin which melted at about 140° C. was prepared from a solution of 55.4 g. of dicyclopentadiene dioxide, 26.4 g. of maleic anhydride, and 23.2 g. of a 3-chloro-1,2-epoxypropane adduct of anhydrous phosphorous acid * having a molecular weight of 344 (equivalents ratio=1.0 epoxy:0.8 carboxyl:0.2 hydroxyl). The solution was cured 3.5 hours at 80° C. and 6 hours at 100° C. to give a clear, brown resin containing 1.99 percent phosphorus and 6.45 percent chlorine. Since the resin melted at a low temperature, it was non-burning by the flammability test.

*Example 14*

A 3-chloro-1,2-epoxypropane adduct of anhydrous phosphoric acid capped with ethylene oxide and illustrated below was used to prepare a flame-resistant epoxy resin.

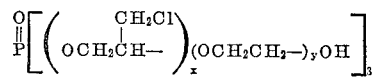

where $x=1.49$, $y=2.60$, average molecular weight=854, percent P=3.62 and percent Cl=18.5.

A mixture consisting of 32.2 g. of dicyclopentadiene dioxide, 15.4 g. of maleic anhydride, and 22.4 g. of a 3-chloro-1,2-epoxypropane adduct of anhydrous phosphoric acid capped with ethylene oxide above illustrated (equivalents ratio=1.0 epoxy:0.8 carboxyl:0.2 hydroxyl) was agitated and heated at 90° C. to effect solution. Resin bars were prepared from this solution by curing for 6 hours at 80° C., 16.75 hours at 100° C., 6 hours at 120° C., 6 hours at 160° C., and 6 hours at 200° C. The resultant resin (percent P=1.15 and percent Cl=5.9) had a Barcol hardness of 57, a heat distortion temperature of 148° C. and was self-extinguishing within 10–52 seconds.

*Example 15*

An ethylene oxide adduct of anhydrous phosphoric acid capped with 3-chloro-1,2-epoxypropane and illustrated below was used to prepare a flame-resistant epoxy resin.

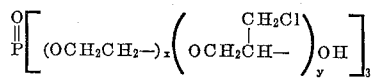

where $x=2.71$, $y=2.29$, average molecular weight=1092, percent P=2.84 and percent Cl=23.2.

A mixture consisting of 29.5 g. of dicyclopentadiene dioxide, 14.2 g. of maleic anhydride, and 26.3 g. of an ethylene oxide adduct of anhydrous phosphoric acid capped with 3-chloro-1,2-epoxypropane (equivalents ratio=1.0 epoxy:0.8 carboxyl:0.2 hydroxyl) was agitated and heated at 90% C. to effect solution. Resin bars were prepared from this solution by curing in exactly the same manner as described in Example 14. The resin (percent P=1.06 and percent Cl=8.7) had a Barcol hardness of 53, a heat distortion temperature of 99° C. and was self-extinguishing within 44–164 seconds.

---

*Prepared by reacting 131 g. (1.42 mols) of 3-chloro-1,2-epoxypropane with 41 grams of anhydrous phosphorous acid (0.5 mol) at a temperature of 50° C. Percent Cl=28.23 (theory=29.19); percent C=29.74 (theory=29.65); percent H=5.51 (theory=5.03); percent P=9.18 (theory=9.00).

Example 16

An agitated solution consisting of 1632 g. of dicyclopentadiene dioxide, 777 g. of maleic anhydride, and 592 g. of a 3-chloro-1,2-epoxypropane adduct of syrupy phosphoric acid having a hydroxyl equivalent=148.6 (equivalents ratio=1.0 epoxy:0.8 carboxyl:0.2 hydroxyl) in 673 g. of toluene was brought to reflux (reaction temperature=143° C.) over a period of 45 minutes. The reaction mixture was maintained at reflux for a period of 2.5 hours, cooled to room temperature, and diluted by the addition of 619 g. of toluene and 708 g. of methyl ethyl ketone to give a 60% solids solution. The resulting solution had the following properties: specific gravity at 25° C.=1.108, viscosity at 25° C.=182 cps.; (percent P=0.8; percent Cl=6.7).

A 12-ply glass cloth laminate was prepared using the above resin solution in the following manner. The resin solution was brushed on the cloth and the solvent was removed in a circulating-air oven at 130° C. for 3 minutes. A lay-up of 12 plies was placed in a press and laminated. The resulting smooth laminate, 23% resin, was self-extinguishing and had the following properties:

| | P.s.i. |
|---|---|
| Ultimate tensile strength | 60,705 |
| Flexural strength | 90,888 |

What is claimed is:

1. A curable composition comprising (1) a vicinal polyepoxide, (2) a phosphorus-containing compound represented by the formula:

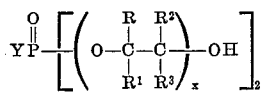

wherein R, $R^1$, $R^2$, and $R^3$ are radicals containing up to 8 carbon atoms selected from the group consisting of hydrogen, alkyl, alkenyl, chloroalkyl and chloroalkenyl, with the proviso that at least one of said radicals is chlorine containing; wherein $x$ is a number from 1 to 8 and Y is selected from the group consisting of hydrogen and a monovalent radical of the formula:

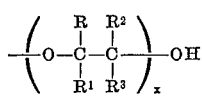

wherein R, $R^1$, $R^2$, $R^3$ and $x$ are as designated above, and (3) a member selected from the group consisting of acid and basic curing catalysts, and organic hardeners having at least 2 groups which are reactive with epoxy groups, said organic hardeners being of the group consisting of polycarboxylic acids, polycarboxylic acid anhydrides, polyhydric alcohols, polyhydric phenols, polythiols, polyisocyanates, polythioisocyanates and polyacyl halides.

2. The cured composition obtained by heating the composition of claim 1.

3. The curable composition of claim 1 wherein the phosphorous compound is represented by the formula:

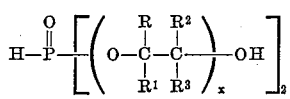

wherein R, $R^1$, $R^2$ and $R^3$ are radicals containing up to 8 carbon atoms selected from the group consisting of hydrogen, alkyl, alkenyl, chloroalkyl, and chloroalkenyl with the proviso that at least one of said radicals is chlorine-containing; and wherein $x$ is a number from 1 to 8.

4. The curable composition of claim 1 wherein the phosphorous compound is represented by the formula:

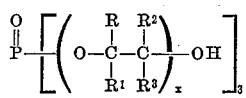

wherein R, $R^1$, $R^2$, and $R^3$ are radicals containing up to 8 carbon atoms selected from the group consisting of hydrogen, alkyl, alkenyl, chloroalkyl and chloroalkenyl with the proviso that at least one of said radicals is chlorine containing and wherein $x$ is a number from 1 to 8.

5. A curable composition comprising (1) a vicinal polyepoxide, (2) a phosphorus compound represented by the formula:

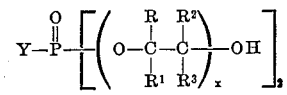

wherein R, $R^1$, $R^2$, and $R^3$ are radicals containing up to 8 carbon atoms selected from the group consisting of hydrogen, alkyl, alkenyl, chloroalkyl and chloroalkenyl, with the proviso that at least one of said radicals is chlorine containing; wherein $x$ is a number from 1 to 8 and Y is selected from the group consisting of hydrogen and a monovalent radical of the formula:

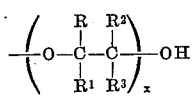

wherein R, $R^1$, $R^2$, $R^3$ and $x$ are as designated above, and (3) an organic hardener having at least two groups which are reactive with epoxy groups and which is selected from the group consisting of polycarboxylic acids, polycarboxylic acid anhydrides, polyhydric alcohols, polyhydric phenols, polythiols, polyisocyanates, polythioisocyanates and polyacyl halides.

6. The cured composition obtained by heating the composition of claim 5.

7. The curable composition of claim 5 wherein the said composition has a phosphorus content of 0.3 to 3.5 percent by weight and chlorine content of 2.3 to 15.0 percent by weight based on the cured composition.

8. The curable composition of claim 5 wherein the phosphorus compound is represented by a member selected from the group consisting of:

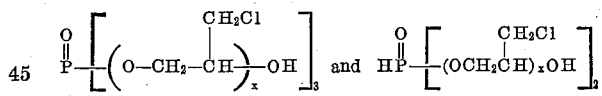

wherein $x$ is an integer from 1 to 8.

9. The curable composition of claim 8 wherein the hardener is a polycarboxylic acid anhydride.

10. The curable composition of claim 8 wherein the hardener is maleic anhydride.

11. The composition of claim 8 wherein the epoxide is a lower alkyl substituted-3,4-epoxycyclohexylmethyl lower alkyl substituted-3,4-epoxycyclohexanecarboxylate.

12. The composition of claim 8 wherein the epoxide is a bis(3,4-epoxycyclohexylmethyl) hydrocarbon dicarboxylate.

13. The composition of claim 8 wherein the epoxide is a polyglycidyl polyether of a polyhydric phenol.

References Cited by the Examiner

UNITED STATES PATENTS

| | | | |
|---|---|---|---|
| 2,372,244 | 3/1945 | Adams et al. | 260—461.312 |
| 2,541,027 | 2/1951 | Bradley | 260—47 |
| 2,568,784 | 9/1951 | Woodstock | 260—2 |
| 2,634,824 | 4/1953 | Drake et al. | 260—461.315 |
| 2,732,367 | 1/1956 | Shokal | 260—47 |
| 2,830,069 | 4/1958 | Smith | 260—461.312 |
| 2,849,418 | 8/1958 | Fang | 260—2 XR |
| 2,909,559 | 10/1959 | Lanham | 260—461.312 |
| 2,917,491 | 12/1959 | Phillips et al. | 260—2 |
| 2,938,877 | 3/1960 | Mack et al. | 260—461.315 |
| 3,058,941 | 10/1962 | Birum | 260—606.5 XR |

(Other references on following page)

FOREIGN PATENTS 757,043   9/1956   Great Britain.

OTHER REFERENCES

Zetzsehe et al., H. Chem. Acta, 9, 708 (1926).

Hackh's Chemical Dictionary, 3rd Ed., 1944, publ. by McGraw-Hill Book Co. (page 310).

Beasley, "Diepoxides With Improved Properties," The Society of Plastics Engineers Journal, 15, No. 4 (April 1959), pages 289–291.

WILLIAM H. SHORT, *Primary Examiner.*

HAROLD BURSTEIN, LOUISE P. QUAST, *Examiners.*

A. LIBERMAN, S. P. SULLIVAN, S. N. RICE,
*Assistant Examiners.*